Oct. 11, 1938.   J. W. WALLIS   2,132,769
PIPE LINE STRUCTURE
Filed Dec. 28, 1936   2 Sheets-Sheet 1
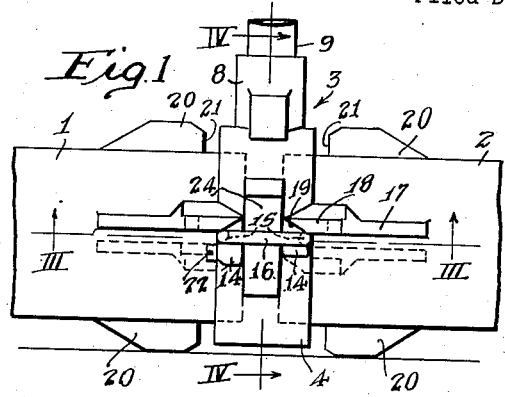
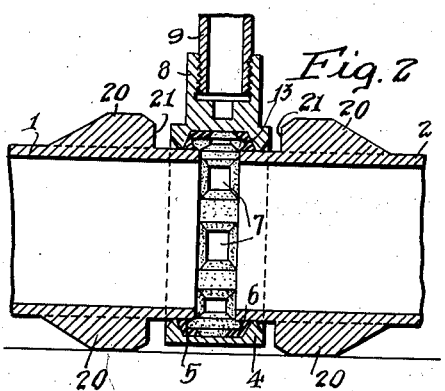
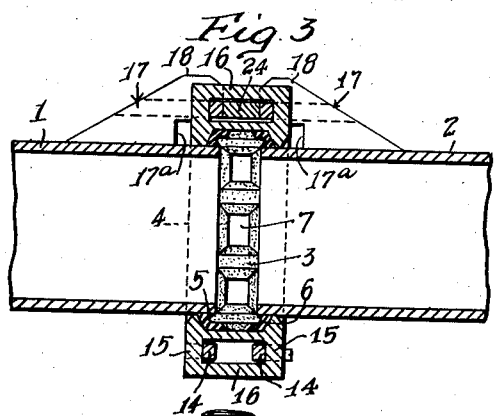
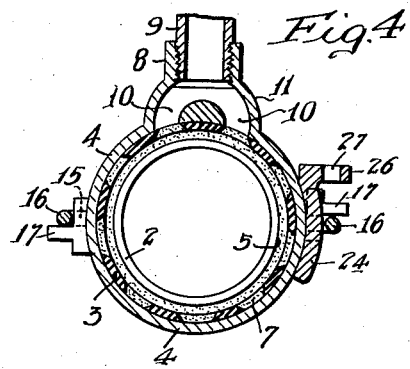
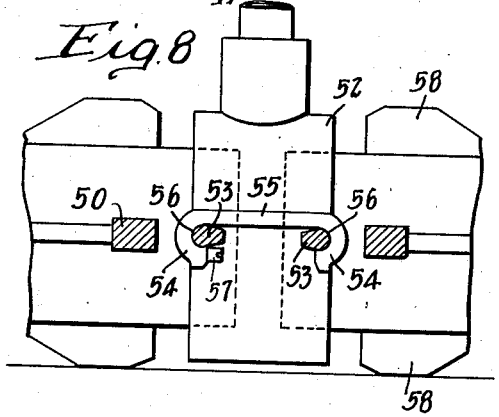
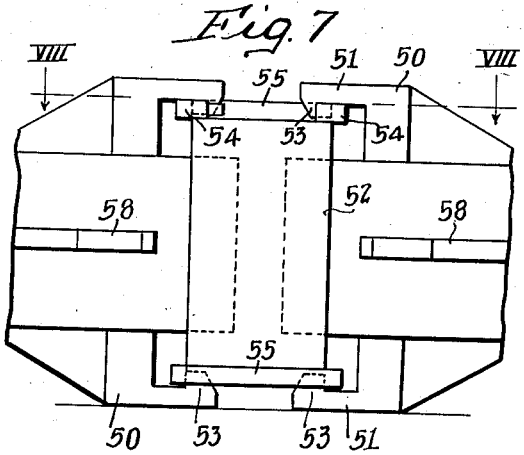
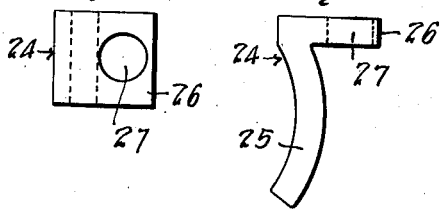
INVENTOR.
John W. Wallis
BY
Lyon Lyon
ATTORNEYS

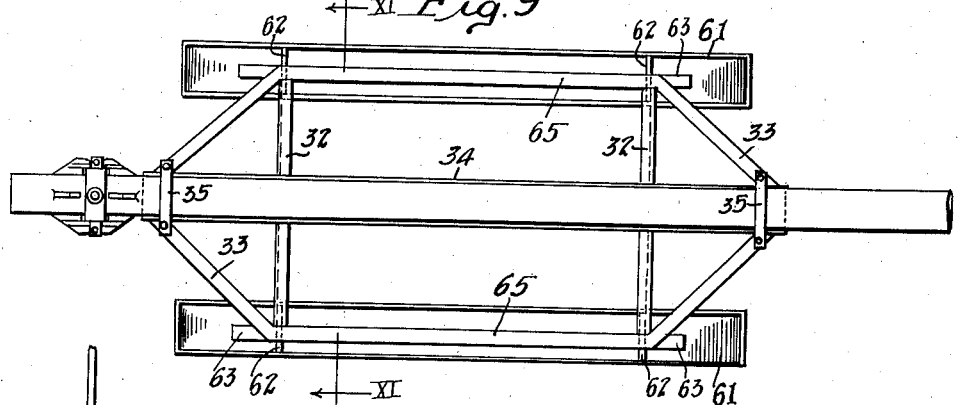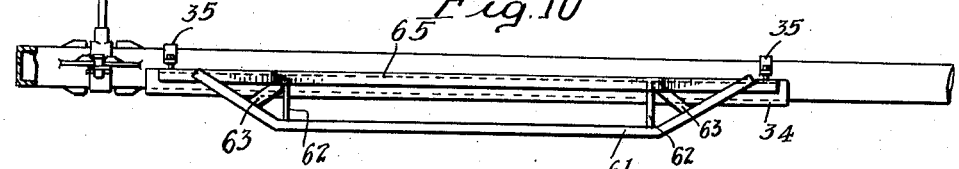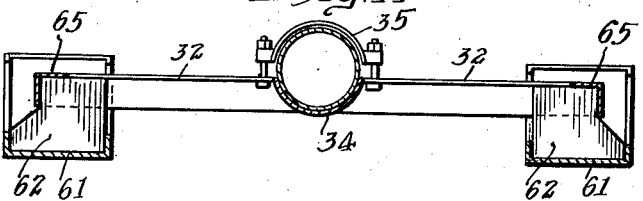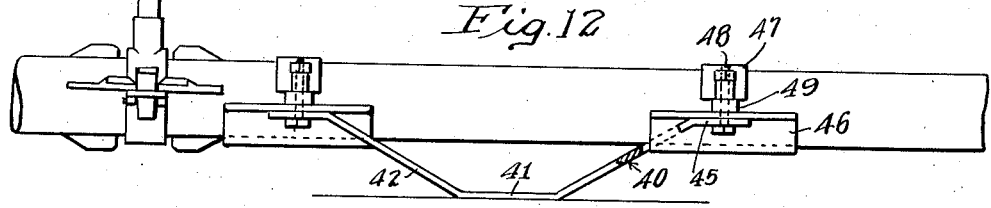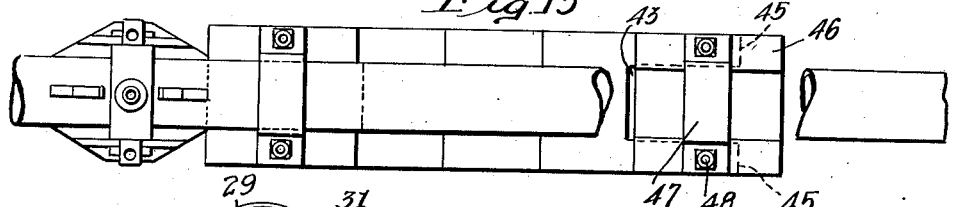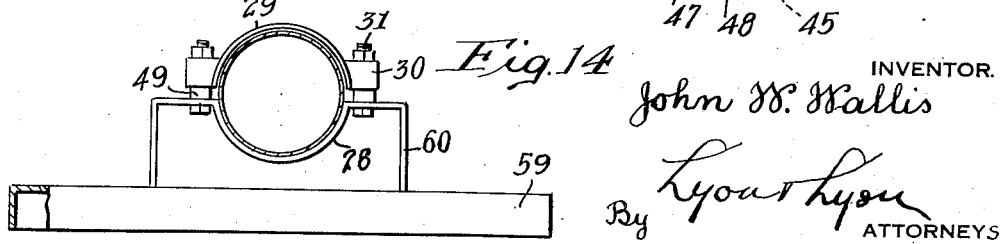

Patented Oct. 11, 1938

2,132,769

UNITED STATES PATENT OFFICE 2,132,769

PIPE LINE STRUCTURE

John W. Wallis, Los Angeles, Calif.

Application December 28, 1936, Serial No. 117,773

16 Claims. (Cl. 285—195)

The invention relates to pipe line structures and particularly to quickly detachable flexible couplings and connections for use in temporary and portable pipe systems such as are employed in irrigation, placer mining, etc.

An object of the invention is to provide a simple, rugged and quickly and easily operable coupling for pipe lines.

Another object is to provide for the connection of spur lines or sprinkler outlets from a pipe line at the coupling between any two sections of pipe.

Another object is to support a pipe line against rotation when laid along the ground.

Another object is to provide a pipe line of flexibly connected sections coupled by couplings that permit free limited angular motion of one pipe section to an adjacent pipe section or the coupling without permitting rotation of either pipe with reference to the coupling.

Another object is to support the ends of pipe sections clear of the ground to prevent the open ends of the pipe being fouled with mud or rubbish while coupling.

Another object is to provide a pipe line made of flexibly connected pipe sections that can be readily and safely towed or dragged from one location to another.

Another object is to support pipe sections lying on the ground in such position as to facilitate connection of other pipe sections thereto.

The manner in which the foregoing objects are accomplished in accordance with the invention, together with various more specific objects and features of the invention, will now be disclosed by describing in detail with reference to the drawings more specific embodiments of the invention.

In the drawings:

Fig. 1 is a side elevation view of the end portions of two pipes coupled together in accordance with one embodiment of the invention;

Fig. 2 is a longitudinal vertical sectional view through the structure shown in Fig. 1;

Fig. 3 is a longitudinal horizontal sectional view of the coupling shown in Figs. 1 and 2, the view being taken in the plane III—III of Fig. 1;

Fig. 4 is a cross section through the same coupling, the view being taken in the plane IV—IV of Fig. 1;

Fig. 5 is a detailed plan view of a locking element employed in the coupling;

Fig. 6 is an end view of the locking member;

Fig. 7 is a bottom view of a modification of the coupling shown in Fig. 1;

Fig. 8 is a vertical section taken in the plane VIII—VIII of Fig. 7;

Fig. 9 is a plan view of a pipe supporting device shown attached to a pipe;

Fig. 10 is a side elevation view of the pipe support shown in plan in Fig. 9;

Fig. 11 is a cross section taken in the plane XI—XI of Fig. 9;

Fig. 12 is a side elevation of an alternative form of pipe coupling member shown attached to a pipe;

Fig. 13 is a plan view of the pipe support shown in Fig. 12; and

Fig. 14 is an end view of still another form of pipe support shown attached to a pipe, the pipe being shown in section.

Referring first to Fig. 1, I have shown the end portions of two pipes 1 and 2, respectively, attached to and interconnected by a coupling member 3. Coupling member 3 comprises a ring 4 adapted to receive the ends of the pipes 1 and 2 and having an annular channel in its inner surface, which channel contains a resilient gasket 5 of rubber or similar material. The outer surface of the gasket 5 fits snugly against the inner surface of the channel in the ring 4 and the gasket itself has inwardly extending end walls which follow along the sides of the channel in the ring 4 and terminate in thin inturned edges or lips 6 which bear against the outer surfaces of the ends of the pipes 1 and 2. When the pipes contain fluid such as water under pressure, the pressure forces the thin lips 6 tightly against the pipe, thereby effecting a seal.

The gasket 5 is also provided with a plurality of openings 7 spaced circumferentially thereabout, the gasket at the edges of the openings being tapered to a thin edge so that fluid pressure within the pipe and coupling forces the edges snugly against the ring 5 to prevent leakage of water out between the gasket and the ring. The inner surface of the ring is preferably rough or irregularly shaped with respect to the outer surface of the gasket 5 so that when the fluid pressure within the pipe line is low water can leak freely at the couplings between the gaskets and the inner surface of the ring. This is advantageous in portable pipe systems such as are used in irrigation for the reason that after the line has been in use in one position it is necessary or at least highly desirable to empty the water out of the line before the sections are disconnected and thereby avoid the excessive discharge of water at any one point along the line. At the completion of an irrigating period the ground along the line is wet and soft and if the water in the line were permitted to escape at one point it might cause serious damage whereas if the water is permitted to leak out uniformly at the joints all along the line the amount of water at any one point is insufficient to cause damage.

As shown in Figs. 1, 2 and 4, the coupling 3 is provided with an outlet nipple 8 for connection to a lateral pipe 9, usually of much smaller dimensions than the main pipe. In an irrigation system the pipe 9 usually extends vertically from the main pipe line and has a sprinkler head mounted on its upper end. To convey water from the interior of the pipe line and the ring 4 through the nipple 8, apertures 10, two in number as shown in Fig. 4, are provided in the ring 4 and a manifold member 11, formed integrally with the ring and the nipple 8, is provided to form a closed connection between the apertures 10 and the nipple 8. These apertures 10 are so spaced as to register with two of the openings or windows 7 in the gasket 5. The two openings 10 are preferably provided in order to provide a large total cross sectional area for the free flow of water from the main pipe line into the lateral pipe 9 in order to reduce the friction and the pressure loss resulting therefrom to provide as much pressure as possible in the line 9 for operating a sprinkler head. It would often be undesirable to provide a single opening large enough to provide the desired free flow of water because the gasket 5 would be too greatly weakened and would not function properly. However, by utilizing two of the windows 7 in the gasket as shown in Fig. 4, the desired free flow of water is obtained without in any way weakening the gasket structure. It is to be understood that if desired more or less than two openings 10 may be provided in the ring and the manifold 11 extended to include the additional openings if more than two are used. However, ordinarily two openings provide sufficiently free flow.

Of course, it will be understood that at those pipe connections where it is not desired to have a lateral pipe 9, the ring 4 will be completely closed and the manifold 11, openings 10 and the nipples 8 eliminated.

An important advantage of a pipe coupling of the general type herein involved is that the coupling is flexible and permits bends at the couplings to permit a change in direction of the pipe line. Such changes in direction are necessary in a vertical direction when the pipe line is laid on uneven ground and is also necessary in a horizontal direction where it is desired to extend the pipe in other than a straight path. Flexibility is also desirable to permit coupling without accurate alignment of the parts during the coupling operation.

To permit free bending of the pipes within the ring 4, the inturned edges of the ring are brought to a relatively narrow edge 13 by tapering the inner surfaces of the channel side walls outwardly and flaring the ends of the ring to provide a conical entrance opening for the pipe ends. This conical entrance is desirable not only for the reason that it helps to provide a narrow contact face 13 but it also facilitates the operation of entering the end of the pipe into the ring. This is important because in making connections the pipe is usually held at the center by a workman while standing erect at a distance from the coupling.

The tapered inner surfaces of the channel side walls in the ring 4 have a special advantage in that they cause the gasket 5 to adhere more tightly to the ring and prevent accidental rotation of the gasket which would move the openings 7 therein out of registration with the apertures 10 in the ring. It will be understood that there is a force applied to the gasket tending to rotate the latter whenever a pipe end is inserted into the coupling and rotated to lock it in position. The gasket 5 is preferably made over-size with respect to the channel in the ring so that it wedges tightly therein between the tapered side walls of the channel in much the same manner as a V belt wedges in a V pulley. As is well known, the resistance to slipping of a V belt in a V pulley is much greater than that of a flat belt on a flat pulley. Furthermore, the frictional contact between the ends of the pipes and the inturned edges of the gasket is analogous to that between a flat belt and a flat pulley so that by using an over-size gasket in the V-shaped channel of the ring the friction between the gasket and the ring is always greater than the friction between a gasket and a pipe so that it is impossible for the gasket to be rotated within the ring in response to rotation of the pipe end in the gasket to couple or uncouple the pipe.

As previously indicated, the ends of the pipe fit loosely in the ring 4. I have found it desirable to make the internal diameter of the opening defined by the pipe contacting edges 13 about one and one-sixty-fourths times the outside diameter of the pipe to be used therewith. This provides sufficient clearance to provide the necessary bending or flexing of the pipe in coupling, accommodates variations in the outside diameters of the pipe ends and permits the entrance of pipe ends that have become slightly battered out of round incident to handling in the field. It is to be understood that the pipes employed with couplings of this sort are light in weight and have relatively thin walls.

Of course, it is necessary to provide some means for retaining the pipe ends within the coupling and it is highly desirable that this means be of such construction as to permit rapid connection and disconnection. As shown in Figs. 1, 3 and 4, the means for securing the pipes to the ring comprises a pair of hooks 14 on the end of each pipe and two pairs of lugs 15 extending outwardly from the collar and adapted to be engaged by the hooks 14 on the pipes. The lugs 15 may be of various shapes but I prefer to make them in the form of cylindrical pins extending outwardly from and formed integrally with the ring 4 (or welded thereto). The pins 15 cooperating with the two hooks on each pipe are positioned on the side of the ring adjacent that pipe. As shown in the drawings, the two pins associated with each pipe are positioned at diametrically opposite points on the ring 4 and the two pins adapted to be engaged by the hooks on the other pipe are aligned longitudinally with the first mentioned pins. This positioning of the pins 15 is desirable since it permits joinder of the upper ends of adjacent pins by an integral bar 16 which affords substantial reinforcement for the pins and protects them against battering or breakage. It is to be understood, however, that if desired the pins associated with one pipe may be displaced as much as 90° circumferentially with respect to the pins cooperating with the other pipe.

The hooks 14 are formed on the end of longitudinally extending lugs 17 welded or otherwise secured to the pipes 1 and 2 and are smoothly tapered from the pipe surface at their rear ends as shown in Fig. 3. The lugs are provided with extensions 18 which extend outwardly radially of the pipe beyond the ends of the pins 15 and the bars 16, to shield the latter when the pipe line is towed. The extensions 18 are provided with inclined faces 19 on the sides thereof adjacent the bars 16 to permit angular movement of the pipes with respect to the coupling without binding.

With the pins 15 and the hooks 14 positioned on the sides of the pipes and coupling as shown in Fig. 1, angular displacement of the pipes with respect to the coupling in a horizontal direction causes the pipe to swing about the pin on one side of the coupling as a hinge, thereby displacing the hook on the other side inwardly away from its associated pin. To limit such movement of the pipe the lugs 17 are provided with end faces 17a (Fig. 3) adapted to abut against the edge of the ring and thereby limit the amount of angular movement possible.

To limit angular movement of the pipe with respect to the coupling in a vertical plane, additional lugs 20 are preferably provided on the pipes, these lugs being positioned at diametrically opposite points spaced 90° from the lugs 17. These lugs 20 have end faces 21 adapted to contact against the edge of the coupling at the limit of angular movement. The lugs 20 are preferably extended radially from the pipe beyond the outer surface of the ring 4 to afford additional protection to the ring when the pipe line is towed.

The hooks 14 as shown are provided with substantially semi-cylindrical seats to engage the pins 15 and the open end of the hook is preferably extended tangentially slightly beyond the center of the pin in a rearward direction when the pin is fully seated in the hook to reduce the possibility of accidental disconnection. Obviously when making connection between the hooks and the pins, the pipe must be forced into the ring substantially as far as it will go, that is, until the shoulders 17a and 21 on the lugs 17 and 20, respectively, abut against the edge of the ring. After such insertion the pipe is then rotated to position the hooks 14 back of the pins and then withdrawn to seat the pins in the hooks.

An important advantage of the coupling construction described is that it permits free angular flexibility of the pipe ends with respect to the coupling while at the same time preventing rotation of either pipe with reference to the coupling ring. Thus after the pins 15 have been engaged against the semi-cylindrical seats provided therefor in the hooks 14, it is impossible to rotate the pipe with respect to the ring 4 without first moving the pipe longitudinally into the ring sufficient to unseat the pins. After the line is laid, such longitudinal movement of any pipe with respect to its associated ring cannot be produced without moving a substantial portion of the line longitudinally. Furthermore if, as will be described later, wedges 24 are employed between juxtaposed hooks 14 on a coupling, longitudinal motion between the pipes and the rings can be prevented. Inward movement of the pipes into the rings is also resisted by internal pressure of fluid within the pipes when the line is in use. This resistance to relative rotation between the pipe sections and the coupling rings is particularly desirable in a line equipped with sprinkler riser pipes 9 as the latter may be maintained in vertical position by securing the pipe line against rotation at any point therealong.

It is often desirable to lock the collar or ring to the pipes and this may be done in various ways. One method is to provide screws or pins 22 in the open ends of the hooks, the elements 22 being inserted, of course, after the hooks have been engaged with the pins. The elements 22 must project sufficiently from the end of the hook to prevent escape of the pin when the pipe is pushed as far into the ring as it will go. It is often desirable to leave one ring 4 permanently attached to one end of each pipe section and the pins or screws 22 are admirably adapted for this purpose. If desired, the elements 22 may be used on all of the hooks where the pipe line is to be left in one position for a considerable time.

As previously mentioned, another method of locking the pipes to the ring is to use wedges 24 adapted to be inserted between the ends of the hooks on the juxtaposed pipes and below the bar 16 as shown in Figs. 1, 3 and 4. Only one wedge 24 is required on each coupling and if there is a bend in the line at the coupling the wedge 24 must of course be placed on the external side of the bend. The wedges 24 preferably comprise a laterally curved wedge portion 25 as shown in Fig. 6 to conform to the curvature of the outer surface of the ring 4 and a flange portion 26 extending outwardly therefrom and having a fingerhole 27 therein to facilitate handling. By making the wedges 24 relatively narrow, so that they do not fit tightly between the hooks 14 on the two pipes, a certain amount of bending at the joint can still take place, the wedge merely functioning to prevent escape of the pins from the hooks.

If desired, the ends of the hooks 14 which abut against the wedge can be round and concentric with respect to the pins so that the wedge will not interfere with vertical bending at the joint.

The advantages of the coupling construction described with reference to Figs. 1, 2, 3 and 4 may still be retained by reversing the positions of the hooks and pins, that is, by attaching the pins to the pipe and mounting the hooks on the coupling ring. Such an arrangement is shown in Figs. 7 and 8. In this construction lugs 50 are provided on the pipes adjacent the ends thereof. These lugs 50 extend radially substantially beyond the periphery of the associated coupling ring 52 and have arms 51 thereon extending longitudinally toward the end of the pipe, which arms 51 have adjacent their outer ends inwardly extending pins 53 which are adapted to engage in seats provided therefor in hooks 54 welded to or formed integrally with the ring 52. As shown in Fig. 8, the two hooks 54 are preferably juxtaposed to each other on the ring 52 for cooperation with pins 53 on the two pipes inserted in the ring. To provide additional strength and protect the two juxtaposed hooks 54, they both preferably have a common arm 55 interconnecting them. The pins 53, as shown in Fig. 8, are elongated in cross section to provide additional strength but they have substantially semi-cylindrical bearing surfaces 56 for contacting the seats in the hooks 54. With the coupling construction shown in Figs. 7 and 8 connection is made between the pipes and the ring 52 in exactly the same manner as with the structure shown in Figs. 1 to 4. One pipe may also be permanently locked to the coupling by inserting a screw or pin 57 in the open end of one of the hooks 54 after the pin 53 on the pipe has been seated in the hook. Additional lugs 58 may also be provided on the pipes to perform the same functions as the lugs 28 in Figs. 1 to 4.

In portable pipe lines of the general type referred to which are laid on the ground, it is often necessary to provide some means for preventing rolling of the pipe. This is particularly true when vertical risers such as the pipe 9 are employed for use in connection with sprinkler heads. Of course, in some instances the pipe is secured against rotation by virtue of the fact that it is rigidly connected at one end to a source of water supply such as a rigid hydrant or pump outlet. However, it is always advisable to lay a portable pipe line of the type to which this invention relates by commencing at the source of water supply and coupling up the component sections progressively away from the source so as to avoid having to shift the entire completely coupled line in order to effect its connection to the source of supply. Therefore when it is necessary to shift the pipe line from one position to another by uncoupling and moving one section of the line at a time, it is necessary to first uncouple the section of the line adjacent the source of supply. Obviously when the first section is disconnected the remainder of the pipe line is free to roll or rotate as a unit and such rolling might effect injury to the riser pipes 9 and sprinkler heads thereon. I therefore find it desirable to provide at least one base secured to the pipe line adjacent its outer end for preventing rolling of the line when it is disconnected from a rigid source of supply. Several suitable constructions of bases are illustrated in Figs. 9 to 14, inclusive. Probably the most simple of these is that disclosed in Fig. 14 in which a base member 59 of channel steel has secured to its upper surface as by welding a saddle member 60 provided with a curved seat portion 28 in which the pipe rests, the pipe being shown in section. The saddle portion 60 is positively secured to the pipe by means of a clamping member 29 which fits over the top of the pipe and is provided with outwardly extended apertured ears 30 which are bolted to the saddle member 60 as by bolts 31. The base member shown in Fig. 14 may be positioned at any point along the pipe line. If desired, one may be provided on each pipe section adjacent the end of the latter to which a coupling ring is permanently attached. This is particularly desirable because the base then always raises the end of the pipe and the coupling clear of the ground, preventing fouling of the coupling and the end of the pipe with mud or rubbish and supporting the coupling in a convenient position for the insertion of the next pipe. When the devices are so employed it may be found desirable to mount the base members loosely on the pipe so that they can turn freely. This may be done by providing sleeves 49 positioned about the bolts 31 between the collar 30 and the saddle member 60, the length of these sleeves being such that when the bolts are tightened the strap 29 is rigidly secured with respect to the saddle 60 but loosely encircles the pipe so that the entire base assembly can rotate on the pipe. With this arrangement, whenever the pipe is lifted the base member naturally rotates into lowermost position by virtue of its weight.

As previously indicated, it is often desirable to move portable pipe lines of the type described from one position to another by towing. Thus if the line is to be moved longitudinally it is much quicker and easier to simply connect a tractor to one end of the line and drag the line into the new position. The pipe and coupling construction already described is particularly adapted for such procedure by virtue of its flexibility and the provision of the ears or lugs 17 and 20 on the pipes which extend radially beyond the rings 4 and therefore tend to shield the ring against contact with objects on the ground and tend to keep the ring raised above the ground surface.

The base members of the type illustrated in Fig. 14 are obviously unsuitable for use on a line that is towed because the channel members 59 would dig into the ground and offer great resistance to movement. Therefore, when a line is to be towed I prefer to employ base members of the type shown in Figs. 9 to 11, inclusive, or Figs. 12 and 13. The base member shown in Figs. 9, 10 and 11 is relatively large and is desirable where only a few, or one, base member is to be employed at one end of the line to restrain the entire line against rotation. It comprises a pair of spaced apart runners 61 which may be formed of channel steel and have their ends turned up as shown in Fig. 10 to glide freely over obstructions. These runner members 61 are interconnected by cross members 32 which may be of angle steel, and diagonal members 33 which may also be of angle steel. The cross members 32 and diagonal members 33 connect at their inner ends to a saddle member 34 which may be of sheet steel curved to conform to the curvature of the pipe and secured thereto at opposite ends by clamp rings 35 similar to the clamp rings 29 in Fig. 14 and secured to the saddle member 34 by bolts in a similar manner. The outer ends of the members 32 and 33 are connected rigidly to longitudinal members 65 positioned above the runners 61. As shown in the drawings, the members 65 are formed integral with the diagonal members 33. Members 65 are connected to the runners 61 by filler plates 62, and struts 63.

The base construction shown in Figs. 12 and 13 is smaller and less expensive than the construction just described with reference to Figs. 9 and 11. It comprises a single runner element 40 formed from a single piece of sheet metal having a horizontal central portion 41 and upwardly inclined end portions 42. The end portions 42 extend up past the lower surface of the pipe to be used therewith and have slots 43 therein extending inwardly from the ends to permit passage of the pipe. The slot 43 of course divides the extreme edge of the runner 40 into two forks 45 which are extended horizontally at their ends and support saddle members 46 which extend below the pipe and are curved to fit the pipe. The saddle members 46 are in turn attached to the pipe by strap members 47 which are secured thereto by bolts 48.

The simple and inexpensive structure shown in Figs. 12 and 13 may often be employed one on each pipe section of a pipe line to be towed for the sole purpose of supporting the pipes and the couplings clear of the ground and providing free traction. In this event it may sometimes be desirable to have the base freely rotatable with respect to the pipe, under which conditions sleeves 49 may be placed about the bolts 48 between the collar 47 and the saddle member 46, as described with reference to Fig. 14, these sleeves being so dimensioned that when the bolts are tightened the strap 47 is rigidly secured with respect to the saddle 46 but loosely encircles the pipe so that the entire base assembly can rotate on the pipe.

Although the invention has been explained by describing certain specific embodiments thereof, it is obvious that many changes can be made from the particular structure shown without departing from the invention and the latter is only to be limited as set forth in the appended claims.

I claim:

1. A pipe coupling comprising the combination with two pipes to be coupled of a ring dimensioned to fit loosely about and overlap the end of at least one of the pipes, means for securing the ring to the other pipe, resilient means within said ring for sealing about the end of said one pipe and means for securing said one pipe against separating movement with respect to said ring comprising a pair of interlocking members one rigidly attached to said ring and the other rigidly attached to said pipe, and one of the members comprising a pin extending radially with respect to the axis of the pipe and ring and having a substantially cylindrical surface, and the other member comprising a hook having a substantially cylindrical seat engaging the cylindrical surface of the pin when the members are in seating relation, said hook being adapted to be engaged with said pin in response to movement of the end of the pipe into the ring with the hook member out of alinement with the pin and subsequent rotation of the pipe within the ring to aline the hook with the pin.

2. A pipe coupling comprising the combination with two pipes to be coupled of a ring dimentioned to fit loosely about and overlap the end of at least one of the pipes, means for securing the ring to the other pipe, resilient means within said ring for sealing about the end of said one pipe, and means for securing said one pipe against separating movement with respect to said ring comprising a pin extending outwardly from the outer surface of said ring, a lug on said one pipe spaced from the end thereof and having a hook on its outer end adapted to be engaged with said pin on the ring in response to movement of the end of the pipe into the ring with the hook out of alignment with the pin and subsequent rotation of the pipe within the ring to align the hook with the pin.

3. A pipe coupling as described in claim 2 in which said lug comprises in addition to said hook a longitudinal shoulder tapering from the surface of the pipe outwardly toward the end of the pipe and extending alongside and radially beyond said pin on the ring to shield the latter.

4. A pipe coupling as described in claim 2 in which said lug has an end face juxtaposed to the edge of said ring to limit movement of the pipe into the ring.

5. A pipe coupling as described in claim 2 in which said lug comprises in addition to said hook a longitudinal shoulder tapering from the surface of the pipe outwardly toward the end of the pipe and extending alongside and radially beyond said pin on the ring to shield the pin, and other tapered lugs on said pipe spaced circumferentially thereabout and extending outwardly beyond the adjacent face of said ring for shielding the ring against impact when the pipe is dragged longitudinally.

6. A pipe coupling as described in claim 2 with reinforcing means integral with said pin and ring extending from the outer end of said pin to said ring at a point displaced from said pin.

7. A pipe coupling as described in claim 2 in which the ring is provided with an inturned narrow annular lip for loosely receiving and guiding the pipe while permitting angular displacement of the pipe with respect to the ring and said pin is substantially in the plane of said annular lip.

8. A pipe coupling comprising the combination with two pipes to be coupled of a ring dimensioned to fit loosely about and overlap the end of at least one of the pipes, means for securing the ring to the other pipe, resilient means within said ring for sealing about the end of said one pipe, and means for securing said one pipe against separating movement with respect to said ring comprising a pair of interlocking members one rigidly attached to said ring and the other rigidly attached to said pipe, and one of the members comprising a lug extending radially with respect to the axis of the pipe and ring and the other member comprising a hook adapted to be engaged with said lug member in response to movement of the end of the pipe into the ring with the hook member out of alinement with the lug member and subsequent rotation of the pipe within the ring to aline the hook with the lug, and a removable stop member in the end of said hook for preventing escape of said lug from said hook.

9. A pipe coupling comprising the combination with two pipes to be coupled of a ring dimensioned to fit loosely about and overlap the ends of said pipes, resilient means within said ring for sealing about the ends of said pipes, and means for securing said pipes against separating movement with respect to said ring comprising a pair of pins extending outwardly from the outer surface of said ring, lugs on said pipes spaced from the ends thereof, each lug having a hook on its outer end adapted to engage with one of said pins on said ring in response to movement of the end of that pipe into the ring with its hook out of alignment with the associated pin and subsequent rotation of the pipe within the ring to align the hook with the pin, and bar means extending across and interconnecting the outer ends of said pins to reinforce the latter.

10. A pipe coupling and lateral connection comprising a pipe and a member to be coupled thereto including a ring dimensioned to fit loosely about and enclose an end of the pipe, means for supporting said pipe relative to said ring, means for effecting a seal between said pipe and ring comprising an annular gasket of resilient material positioned within said ring in overlapping relation to the end of said pipe, said gasket having a thin inturned annular edge adapted to lie against the outer surface of said pipe whereby fluid pressure existent in the pipe is applied to the interior of the gasket and presses said edge against the outer surface of the pipe, said ring having a lateral discharge aperture therein and said gasket having a discharge aperture therethrough registering with said ring aperture and the edges of the discharge aperture in the gasket being relatively thin whereby they are pressed into sealing engagement with the ring by fluid pressure within the pipe.

11. A pipe coupling and lateral connection comprising a pipe and a member to be coupled thereto including a ring dimensioned to fit loosely about and enclose an end of the pipe, means for supporting said pipe relative to said ring, means for effecting a seal between said pipe and ring comprising an annular gasket of resilient material positioned within said ring in overlaping relation to the end of said pipe, said gasket having a thin inturned annular edge adapted to lie against the outer surface of said pipe whereby fluid pressure existent in the pipe is applied to the interior of the gasket and presses said edge against the outer surface of the pipe, said ring having a plurality of circumferentially spaced lateral discharge apertures therein, said gasket having a plurality of lateral discharge apertures therethrough registering with the apertures in the ring, the edges of the discharge apertures in the gasket being relatively thin whereby they are pressed in sealing engagement with the ring by fluid pressure within the ring, a nipple extending from said ring for connection of a lateral pipe line, and wall means on said ring defining a closed manifold connecting said plurality of apertures with said nipple.

12. A pipe coupling as described in claim 10 in which said gasket is normally of larger outside diameter than the inside diameter of said ring whereby the gasket when positioned in the ring expands thereagainst and is restrained against rotation therewithin.

13. A pipe coupling and lateral connection comprising a pipe and a member to be coupled thereto including a ring dimensioned to fit loosely about and enclose an end of the pipe, means for supporting said pipe relative to said ring, said ring having an annular channel therein the end walls of which taper radially inwardly and longitudinally toward the orifices of the ring, means for effecting a seal between said pipe and ring comprising an annular gasket of resilient material positioned within said annular channel in said ring, said gasket being slightly over-size with respect to the channel in which it seats whereby the gasket is wedged tightly in said channel, said gasket having a thin inturned annular edge adapted to lie against the outer surface of said pipe whereby fluid pressure existent in the pipe is applied to the interior surface of the gasket and presses said edge against the outer surface of the pipe, said ring having a lateral discharge aperture therein and said gasket having a discharge aperture therethrough and the edges of the discharge aperture in the gasket being relatively thin whereby they are pressed into sealing engagement with the ring by fluid pressure within the pipe.

14. A pipe coupling comprising the combination with two pipes to be coupled of a ring dimensioned to fit loosely about and overlap the ends of said pipes, resilient means within said ring for sealing about the ends of said pipes, and means for securing said pipes against separating movement with respect to said ring comprising a pair of pins extending outwardly from the outer surface of said ring, lugs on said pipes spaced from the ends thereof, each lug having a hook on its outer end adapted to engage with one of said pins on said ring in response to movement of the end of that pipe into the ring with its hook out of alignment with the associated pin and subsequent rotation of the pipe within the ring to align the hook within the pin, and bar means extending across and interconnecting the outer ends of said pins to reinforce the latter, and wedge means insertable below said bar means and between the hooks on said pipes for locking said hooks in engagement with said pins.

15. A pipe coupling comprising the combination with two pipes to be coupled of a ring dimensioned to fit loosely about and overlap the ends of said pipes, resilient means within said ring for sealing about the ends of said pipes, and means for securing said pipes against separating movement with respect to said ring comprising a pair of pins extending outwardly from the outer surface of said ring, lugs on said pipes spaced from the ends thereof, each lug having a hook on its outer end adapted to engage with one of said pins on said ring in response to movement of the end of that pipe into the ring with its hook out of alignment with the associated pin and subsequent rotation of the pipe within the ring to align the hook with the pin, and bar means extending across and interconnecting the outer ends of said pins to reinforce the latter, and wedge means insertable below said bar means and between the hooks on said pipes for locking said hooks in engagement with said pins, said wedges being curved to fit about said ring.

16. A pipe coupling comprising the combination with two pipes to be coupled of a ring dimensioned to fit loosely about and overlap the end of at least one of the pipes, means for securing the ring to the other pipe, resilient means within said ring for sealing about the end of said one pipe, and means for securing said one pipe against separating movement with respect to said ring comprising a lug on said pipe extending radially outwardly and then longitudinally toward the end of the pipe and having an end portion extending inwardly toward the axis of the pipe, and a hook member on the exterior surface of said ring adapted to be engaged with said inwardly extending end of said lug on said pipe, by movement of the pipe into the ring with said lug out of alignment with said hook, rotating said pipe with respect to said inwardly projecting end with said hook and withdrawing said pipe to seat said end in said hook.

JOHN W. WALLIS.